United States Patent [19]
Albert

[11] 3,771,371
[45] Nov. 13, 1973

[54] ACCELEROMETER HAVING A LIQUID PROOF MASS

[75] Inventor: William C. Albert, Boonton, N.J.

[73] Assignee: The Singer Company, Little Falls, N.J.

[22] Filed: Nov. 26, 1971

[21] Appl. No.: 202,327

[52] U.S. Cl. .......................................... 73/516 LM
[51] Int. Cl. ............................................. G01p 15/08
[58] Field of Search............ 73/516 LM, 515, 516 R

[56] References Cited
UNITED STATES PATENTS

| | | | |
|---|---|---|---|
| 2,943,493 | 7/1960 | Bosch et al. ...................... | 73/516 R |
| 3,602,049 | 8/1971 | Albert............................... | 73/516 R |
| 3,530,727 | 9/1970 | Albert............................... | 73/516 R |

Primary Examiner—James J. Gill
Attorney—S. A. Giarratana et al.

[57] ABSTRACT

An accelerometer is provided comprising, a housing having a longitudinal sensing axis, a proof mass disposed in the housing and displaceable relative thereto, pickoff means disposed adjacent the proof mass and connected to the housing for sensing displacement of the proof mass, and force means mounted on the housing and disposed adjacent the proof mass for returning the proof mass to its null position after such displacement, wherein the proof mass comprises, a non-wetting liquid, and a container which is floated by the liquid and which is arranged to contain the liquid within the housing.

6 Claims, 5 Drawing Figures

PATENTED NOV 13 1973 3,771,371

ACCELEROMETER HAVING A LIQUID PROOF MASS

The present invention relates to accelerometers, and particularly to an accelerometer which has a liquid proof mass.

A conventional accelerometer includes a housing, a proof mass disposed in said housing and displaceable relative thereto, pickoff means for sensing the displacement of the proof mass relative to the housing, and force means for returning the proof mass to its null position after displacement thereof.

One problem with the conventional accelerometer is the restraint on the proof mass which is provided by the portion of the housing that supports the proof mass. In a conventional single-axis accelerometer, which has a piston-like proof mass and a cylinder-like housing, there are friction forces applied to the proof mass by the housing which tend to reduce the sensitivity of the accelerometer. In another type of single-axis accelerometer, which uses a pendulous-type proof mass having a single-axis flexure member for connecting the proof mass to the housing, there is a bending moment restraint applied by the housing to the proof mass, which tends to reduce the sensitivity of the accelerometer.

In accordance with one embodiment of the present invention, the restraint of the housing upon the proof mass is minimized by using a proof mass including a liquid proof mass portion and an adjustable floating container therefor. With this type of accelerometer, the friction forces between the proof mass and the housing are substantially minimized. Thus, the sensitivity of the accelerometer according to the invention is not substantially reduced by any restraint applied by the housing upon the proof mass.

Accordingly, it is one object of the present invention to provide an accelerometer including a housing and a proof mass disposed in said housing, wherein any restraint applied by the housing upon the proof mass is minimized.

It is another object of the invention to provide a single-axis accelerometer according to the aforementioned object wherein the proof mass is a liquid arranged to provide axial null stability and cross-axis force stability.

It is a further object of the invention to provide a single-axis accelerometer according to the aforementioned objects wherein the proof mass is a mercury portion having an automatically axially-adjustable container arranged for minimizing temperature sensitivity.

According to the present invention, and in fulfillment of the above objects, there is provided an accelerometer comprising, a housing having a longitudinal sensing axis, a proof mass disposed within said housing and displaceable relative thereto, pickoff means for sensing the displacement of the proof mass, and force means for returning the proof mass to its null position after such displacement.

Other objects of the invention will become apparent upon readong the following description and the accompanying drawings, wherein like parts are designated by like numerals throughout the several views and wherein.

Figure 1:
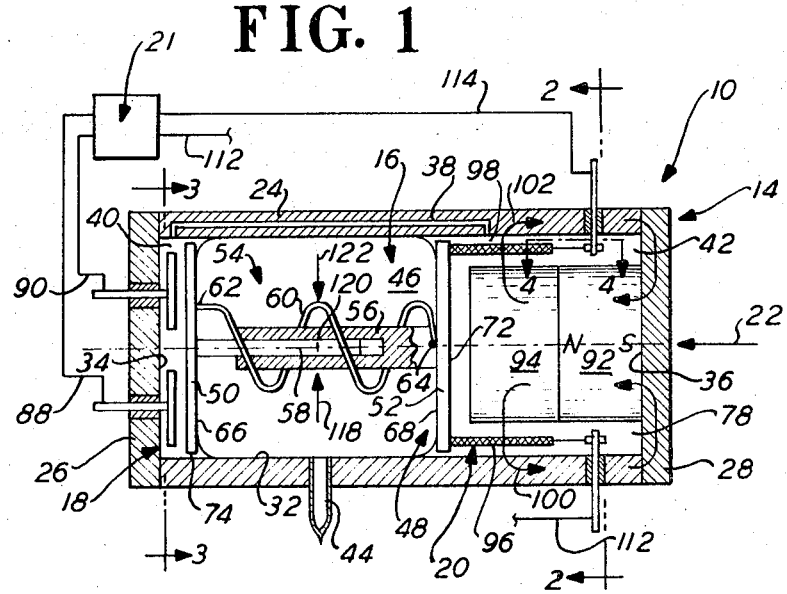
FIG. 1 is a sectional view of a single-axis accelerometer embodying features of the present invention.
Figure 2:
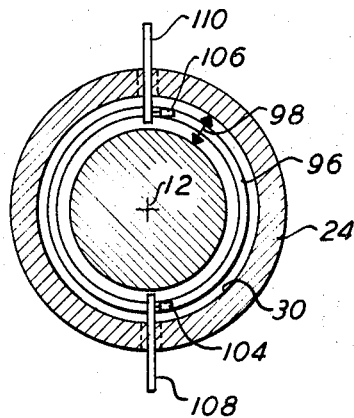
FIG. 2 is a sectional view as taken along the line 2—2 of FIG. 1.
Figure 3:
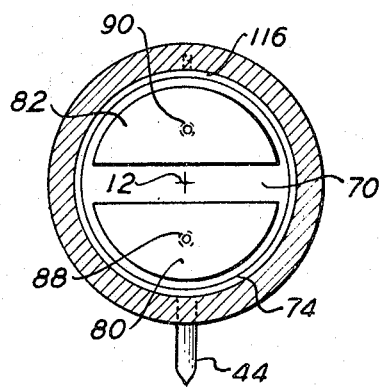
FIG. 3 is a sectional view as taken along the line 3—3 of FIG. 1.

As shown in FIG. 1, one embodiment of the present invention is an accelerometer 10. Accelerometer 10, which has a longitudinal axis 12, includes a housing 14, a proof mass 16, pickoff means 18, and force means 20. Force means 20 and pickoff means 18 are connected to a conventional servo system 21 whereby pickoff means 18 senses the displacement of proof mass 16 relative to housing 14 along axis 12 and whereby force means 20 returns proof mass 16 to its null position after such displacement occurs in order to sense an axial acceleration force 22.

Housing 14 includes a peripheral wall 24 and a pair of axially spaced end walls 26, 28 which enclose a cavity 30. Peripheral wall 24 has a radially inner surface 32. End walls 26, 28 have respective axially inner surfaces 34, 36, which face cavity 30. Peripheral wall 24 has a first passage 38, which extends from a first cavity portion 40 on one side of proof mass 16 to a second cavity portion 42 on the other side of proof mass 16. Peripheral wall 24 also has a second passage 44 for evacuating cavity 30 after housing 14 is sealed and assembled. Passage 44 may be a fill tube which can be crimped for sealing the passage 44 after placing the proof mass 16 in housing 14.

Proof mass 16 includes a non-wetting liquid 46, such as mercury, and an adjustable container 48. Container 48 has a pair of discs 50, 52, which bear against liquid 46, and a connector device 54, which interconnects discs 50, 52 and which urges discs 50, 52 in bearing against liquid 46. Discs 50, 52 and connector 54 form the container 48, which contains liquid 46 within housing 14.

Connector device 54 includes a cylinder 56 which is fixedly connected to disc 52 at one end thereof, a rod 58 which is received in cylinder 56 and which is fixedly connected to disc 50 at one end thereof and a tension spring 60. Tension spring 60 has a left end portion 62, which is fixedly connected to disc 50 and a right end portion 64, which is fixedly connected to disc 52. Spring 60 surrounds cylinder 56.

Discs 50, 52 have respective axially inner faces 66, 68, and have respective axially outer faces 70, 72. Inner faces 66, 68 respectively connect to opposite end portions 62, 64 of spring 60. Outer face 70 cooperates with pickoff means 18 as explained hereafter, and outer face 72 connects to force means 20 as explained hereafter. Discs 50, 52 also have respective radially outer surfaces 74, 76 of cylindrical shape. An inert gas 78, such as helium, fills all portions of cavity 30 except that portion of cavity 30 which is filled by liquid 46. Spring 60 urges discs 50, 52 toward each other and applies a pressure on liquid 46 so that the pressure of liquid 46 is greater than the pressure of inert gas 78.

Figure 5:
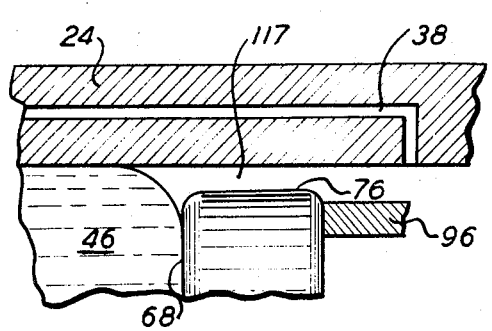
FIG. 5 is another enlarged view of another portion of FIG. 1.
Figure 4:
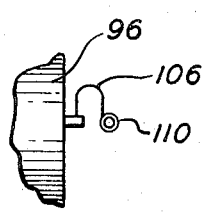
FIG. 4 is an enlarged view of a portion of FIG. 1.

Liquid 46, which is a non-wetting liquid, such as mercury, is contained near the radially outer surfaces 74, 76 of discs 50, 52, as shown in FIG. 5. Liquid 46 bears against the axially inner faces 66, 68 of discs 50, 52, and does not bear against the radially outer surfaces 74, 76 of discs 50, 52, because liquid 46 is contained due to its coalescent property, that is, the cohesive forces in liquid 46 are greater than the adhesive forces in liquid 46.

Inert gas 78, which fills the portions 40, 42 of cavity 30 and which fills passage 38 is displaced through passage 38 when proof mass 16 is displaced. The parameters of passage 38 and the properties of inert gas 78 are chosen so that the desired damping characteristics for proof mass 16 are provided.

Pickoff means 18 includes a pair of capacitor plates 80, 82 which cooperate with disc 50 for sensing axial displacement of proof mass 16 relative to housing 14. Plates 80, 82 have respective terminals 84, 86, which are embedded in wall 26 for supporting plates 80, 82. Terminals 84, 96 project from wall 26 and connect to respective conductors 88, 90, which connect to servo system 21.

Force means 20 includes a magnet 92 which is fixedly mounted on end wall 28, a return path member 94 which is fixedly mounted on magnet 92, and a force coil 96 which is fixedly mounted on disc 52. Magnet 92, which is oriented in a north-south direction, along axis 12 as shown in FIG. 1, is a solid bar of cylindrical shape that is composed of a ferrous material.

Return path member 94, which is also a solid bar of cylindrical shape that is composed of a ferrous material, is spaced from peripheral wall 24 forming an air gap 98 of cylindrical shape therebetween. Force coil 96 is disposed in air gap 98 and is spaced from return path member 94 and from peripheral wall 24. Force coil 96 is in the path of a flux field 100, 102, which is cylindrical in shape. Flux field 100, 102 extends from the north end of magnet 92, through return path member 94, thence through force coil 96 and air gap 98, thence through peripheral wall 24, thence through end wall 28 to the south end of magnet 92.

Force coil 96, which is fixedly mounted on disc face 72, has a pair of flexleads or conductors 104, 106. Flexleads 104, 106 are connected to respective terminals 108, 110, which are embedded in peripheral wall 24 for support thereof and which are arranged for connection to a pair of exterior conductors 112, 114 that connect to servo system 21.

In the construction of accelerometer 10, housing 14 is assembled with discs 50, 52 and connector device 54 disposed within cavity 30. Housing 14 is sealed so that cavity 30 can be evacuated through fill tube 44. After evacuation of cavity 30, inert gas 78 is pumped through tube 44 into cavity 30. Then, liquid 46 of a selected quantity is pumped through tube 44 into cavity 30 thereby filling the portion of cavity 30 between discs 50, 52 and forcing inert gas 78 into the end cavity portions 40, 42 and passage 38. Thereafter, tube 44 is sealed.

The parameters of the pressure and volume of inert gas 78, the pressure and volume of liquid 46, the tension force present in spring 60, and the thickness of each of the respective gaps 116, 117 around discs 50, 52 are chosen so as to achieve the desired radial buoyancy of proof mass 16 and the desired axial displacement of proof mass 16 for sensing the axial acceleration force 22. The parameters of spring 60 are also chosen so that the pressure of liquid 46 is higher than the pressure of inert gas 78.

Proof mass 16 is designed so that a buoyant force 118 is applied by the mercury liquid 46 against the assembly discs 50, 52, force coil 96 and connector device 54 and is directed through the center of gravity 120 of said assembly of discs 50, 52, force coil 96 and connector device 54.

The assembly of discs 50, 52, force coil 96 and connector device 54 have a weight 122, which acts at the center of gravity 120 thereof. The buoyant force 118 is chosen, by choosing the sizes and materials of the discs 50, 52, force coil 96, and connector device 54, so as to be equal and opposite to weight 122. Thus, proof mass 16 is floated in a radial direction, but is not floated in an axial direction.

In the axial or sensing direction of the mass, proof mass 16 is equal to the mass of the assembly of discs 50, 52, force coil 96 and connector device 54, plus the mass of liquid 46. It is also noted that the axial forces caused by the pressure of liquid 46 against disc inner faces 66, 68 are equal and opposite and are resisted by spring 60. It is also noted that the center of gravity 120 of the assembly of discs 50, 52, force coil 96 and connector device 54 is about midway between disc 50 and disc 52. To counteract the eccentric weight effect of force coil 96, it is preferable if left disc 50 is slightly heavier than right disc 52.

The structure of accelerometer 10 provides a number of advantages. Proof mass 16 is buoyantly supported in a radial direction by fluid 46 thereby minimizing the normal forces of proof mass 16 against housing peripheral wall 24 and thereby minimizing the friction forces between proof mass 16 and housing 14. The buoyant force 118, which acts on the assembly of the discs 50, 52, force coil 96 and connector 54, is also substantially temperature insensitive. The connector 54 and discs 50, 52, which contain liquid 46, are automatically adjustable in an axial direction to allow for temperature expansion of liquid 46 so that the buoyant force 118 remains substantially constant under temperature change. In addition, the resistance by liquid 46 to a cross-axis acceleration force normal to axis 12, is automatically adjustable. Thus, the sensitivity of the proof mass 16 for sensing acceleration force 22 along axis 12 is not substantially lessened due to temperature change or due to cross-axis forces.

The structure of accelerometer 10 also assures that null stability is substantially provided because the proof mass 16 does not receive any restraining forces or moments when deflected from its null position which tend to return the proof mass 16 to its null position, other than the force applied by force means 20. A further advantage of accelerometer 10 is its insensitivity to very low temperatures because of the arrangement including inert gas 78 and proof mass 16 with its automatically temperature compensating structure 54. Another advantage of accelerometer 10 is the ease of manufacture thereof.

While the present invention has been described in a preferred embodiment, it will be obvious to those skilled in the art that various modifications can be made therein within the scope of the invention. As a first example, the outer profiles of the discs and the corresponding inner profile of the peripheral wall of the housing can have an elliptical shape, in place of the disclosed circular shape, so that any slight rotation of the proof mass relative to the housing can be avoided. As a second example, accelerometer 10 can be used as an integrating type of accelerometer, for use as a velocity sensing switch, by slight modifications including the addition of switch means thereto. Thus, it is intended that the appended claims cover all such modifications.

What is claimed is:

1. An accelerometer comprising, a housing having a longitudinal sensing axis, a proof mass disposed in said housing and displaceable relative thereto, pickoff means mounted on said housing and disposed adjacent said proof mass for sensing the displacement of said proof mass, and force means mounted on said housing and disposed adjacent said proof mass for returning the proof mass to its null position after such displacement, wherein said proof mass comprises, a non-wetting liquid, and a container floated by said liquid and arranged to contain said liquid within said housing, said container including a pair of axially spaced discs disposed in bearing against said liquid, and a connector device, wherein said connector device includes, an elongate rod received in said cylinder and fixedly connected at one end thereof to the other of said discs, and tension spring means disposed between said discs, said tension spring means having opposite end portions connecting to said discs in bearing against said liquid.

2. The accelerometer as claimed in claim 1, wherein said housing includes, a peripheral wall and a pair of axially spaced end walls enclosing a cavity, said cavity being adapted to receive said proof mass, said peripheral wall having an elongate passage, said cavity having a first end portion disposed on one side of said proof mass and connecting to one end of said passage, said cavity having an opposite end portion disposed on the opposite side of said proof mass and connecting to an opposite end of said passage.

3. The accelerometer as claimed in claim 2, including an inert gas disposed in said first cavity portion and said second cavity portion and said interconnecting passage, said inert gas having a pressure which is substantially lower than the pressure being substantially different than the ambient pressure outside said housing.

4. The accelerometer as claimed in claim 3, wherein said pickoff means includes a pair of capacitor plates cooperating with one of said discs for sensing axial displacement of said proof mass relative to said housing, said capacitor plates having respective terminals embedded in said housing end wall adjacent hereto and projecting from said wall for connection to exterior conductors.

5. The accelerometer as claimed in claim 4, wherein said force means includes a magnet fixedly mounted on one of said housing end walls, a return path member fixedly mounted on said magnet for providing a flux field, and a force coil fixedly mounted on one of said proof mass discs, said return path member being disposed radially inwardly of said housing peripheral wall forming a cylindrical air gap therebetween, through which said flux field extends said force coil being disposed in said air gap for sensing said flux field, said force coil having terminals embedded in said housing wall and projecting therefrom for connection to exterior conductors.

6. The accelerometer as claimed in claim 5, including a servo system having conductors respectively connecting to said pickoff terminals and having conductors respectively connecting to said force coil terminals.

* * * * *